May 19, 1959

J. E. KOPP 2,886,986

INFINITELY VARIABLE FRICTION DRIVE

Filed April 18, 1957

May 19, 1959  J. E. KOPP  2,886,986
INFINITELY VARIABLE FRICTION DRIVE
Filed April 18, 1957  2 Sheets-Sheet 2

United States Patent Office 2,886,986
Patented May 19, 1959

2,886,986
INFINITELY VARIABLE FRICTION DRIVE

Jean Ernst Kopp, Berne, Switzerland

Application April 18, 1957, Serial No. 653,691

Claims priority, application Switzerland July 7, 1956

10 Claims. (Cl. 74—796)

The present invention relates to infinitely variable friction drives of the type having friction rolls with double-conical surfaces and with an axis of rotation extending at an angle to the common axis of the running surfaces, between which the friction rolls are arranged, wherein the transmission ratio between the driving and the driven shaft may be infinitely varied by moving the friction rolls in the direction of the axis of the running surfaces.

In such friction drives hitherto known the conical surface lines of the friction rolls, contacting the running surfaces, are parallel to the axis of the running surfaces and these two surfaces are located in a common plane. Owing to the contact pressure, in the supporting arrangement of the friction rolls very high bearing pressures will arise, which tend to increase the frictional losses of the drive and to decrease the efficiency of same.

It is an object of the invention to avoid the above disadvantage and to provide an infinitely variable friction drive, in which the conical circumferential surfaces of the friction rolls, engaging the running surfaces, are inclined to the axis of the running surfaces and the two running surfaces are staggered to each other in the direction of their common axis so that the bearing pressures of the friction rolls produced by the contact pressure are compensating each other at least partly. As it has been found, the efficiency of the drive can thereby be substantially increased.

The present invention will now be described more fully with reference to the accompanying drawings illustrating, by way of example, several embodiments of the invention, and in which.

Figure 1:
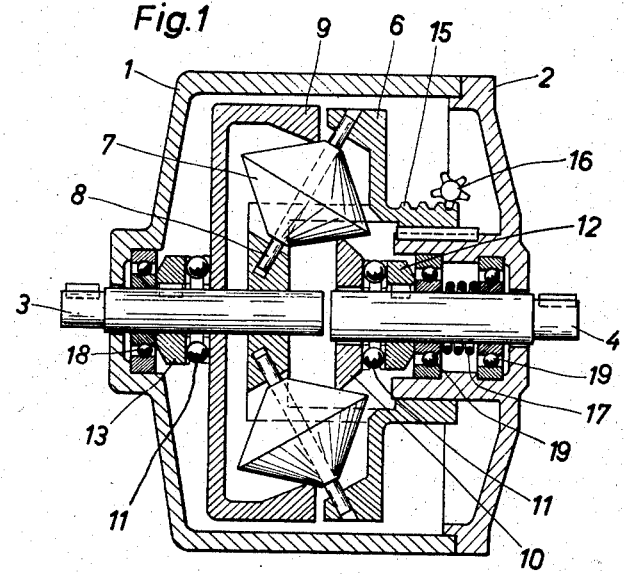
Fig. 1 is a section through a friction drive according to the invention having double-conical friction rolls with inclined axes.

Referring to the example shown in Fig. 1, the numeral 1 designates a housing having a cover 2 threadedly secured therewith. A shaft 3 is rotatably supported in the housing 1 by means of a ball bearing 18, and a shaft 4 is supported in the cover 2 by means of ball bearings 19. A number of friction rolls 7, for instance four, which are provided with double-conical surfaces are arranged on a carrier 6 in planetary relationship and rotatably supported so that their rotary axes 8 are disposed at an angle to the axis of the shafts 3 and 4. The axes 8 either may form part of the rolling bodies 7, or may be inserted into said bodies. The axes 8 together with the friction rolls 7 can be moved in the direction of their longitudinal axis.

Figure 1A:
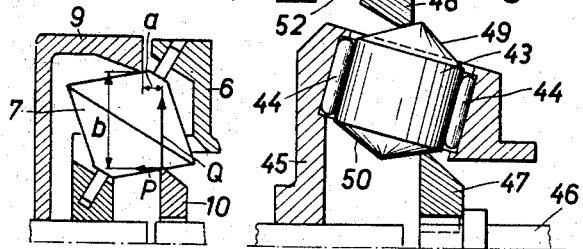
Fig. 1a is a section showing the axial and radial components of the contact pressure applied to a friction roll.

The friction rolls 7 are in frictional engagement on one side with a running surface of a disk 10 and on the opposite side with the running surface of a ring member 9. The disk 10 and also the ring member 9 are rotatably supported on the shafts 4 or 3, respectively, but they are not directly secured therewith in rigid manner. The ring 12 which is rigidly connected to the shaft 4 forms a coupling together with the disk 10, since these parts are provided with annular end surfaces facing each other, wherein are formed oppositely inclined sloping surfaces. Cooperating with these sloping surfaces are balls 11 which are spaced apart from each other by means of a ball cage. This coupling provided between disk 10 and shaft 4 acts as a device for automatically controlling the contact pressure exerted by the disk 10 upon the friction rolls 7, as the balls 11 climb up on the inclined surfaces and urge the disk 10 against the friction rolls 7. The conical circumferential surface of the friction rolls 7, which engages the running surface of the disk 10, is inwardly inclined so that an increased contact pressure will be obtained on the engaged surface by means of the axial movement of the disk 10. The conical circumferential surface of the friction rolls 7 contacting the running surface of the ring member 9 is also arranged at an incline, preferably of the same size, so that these two surfaces are parallel to each other. The conical circumferential surfaces contacting the running surfaces are inclined with respect to the axis of rotation of the running surfaces in such a manner, and the two running surfaces are staggered in the direction of their axis or axially spaced apart from each other so that the dextrorotatory momentum, exerted upon the friction rolls 7 in the illustrated plane of Fig. 1a and produced by the axial component P of the contact pressure together with the distance $b$, corresponds at least approximately to the laevorotatory momentum which is produced by the radial component Q of the contact pressure and the distance $a$. These two momenta thus are compensated partly or entirely so that the bearing pressures from the contact forces of the friction rolls become low or zero.

As may be seen from Fig. 1, the disk 10 is mounted freely rotatably upon the shaft 4 so that said disk and its running surface, respectively, will be adjustable in radial direction.

Arranged between the ring member 9 and the ring 13 which is rigidly connected with the shaft 3 are balls 11 cooperating in similar manner with inclined surfaces, in order to obtain a device for the automatic control of the contact pressure. By the arrangement of such a device on the input shaft and also on the output shaft, the automatic regulation of the contact pressure is obtained within the entire regulating range.

The carrier 6, which within the cover 2 is supported on the shaft 3 non-rotatably but axially movable, comprises a toothed section formed as a rack in which a toothed gear 16 engages. The carrier 6 may be displaced in axial direction by rotating the gear 16.

In the position shown in Fig. 1, the disk 10 engages the friction rolls 7 at a large diameter, the member 9 on the other hand makes contact at a small diameter; thereby a step-down ratio is transmitted to the shaft 3 when the shaft 4 is driven.

Figure 2:
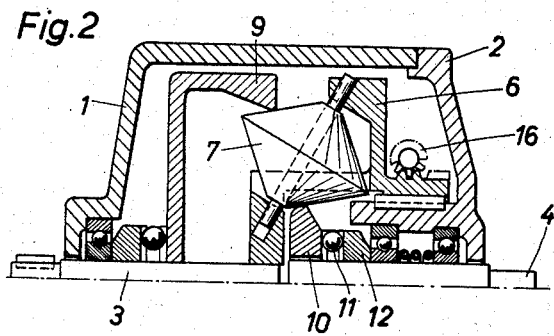
Fig. 2 shows the same friction drive as illustrated in Fig. 1, but in this case the friction rolls occupy a position for an increase transmission ratio.

In Fig. 2 the carrier 6 is shown moved in axial direction so far that the disk 10 contacts the friction rolls 7 on a small diameter, while the member 9 contacts on a large diameter; thereby a step-up ratio is transmitted to the shaft 3 by the shaft 4. Infinitely variable transmission ratios may thus be adjusted by moving the carrier 6 in axial direction.

The spring 17 exerts an axial pressure upon the ring 12 and the disk 10 so as to provide a friction pressure between the disk 10, the ring 9 and the friction rolls during starting before the contacting device becomes effective.

Figure 3:
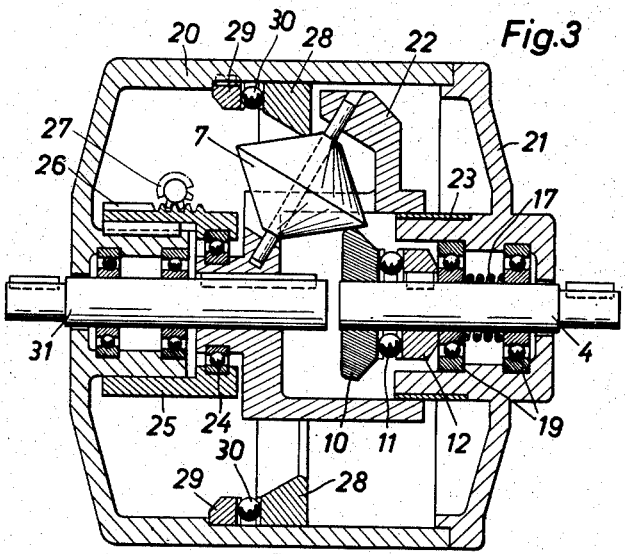
Fig. 3 is a construction in which the outer ring remains stationary while the friction rolls revolve together with their associated carriers in a planetary manner.

In Fig. 3, the shaft 4 is supported in the cover 21, threadedly secured to the housing 20, by means of the ball bearings 19 and has mounted on it the disk 10, balls 11 and ring 12 of the contacting device in the same manner as shown in Fig. 1. The friction rolls 7 are journalled in a carrier 22, which is rotatably supported with one end upon a bearing bushing 23 of the cover 21 and with the other end in a socket 25 by means of a ball bearing 24. The socket 25 is splined to the housing 20, but movable in axial direction and is provided with a toothed rack section 26 which is engaged by the gear wheel 27 which in turn may be rotated by a handwheel located at the outside. The ball bearing transmits the displacing movement of the socket 25 to the rotary carrier 22. The ring member 28, which is frictionally engaged by the friction rolls 7, is in this case movably arranged within the housing 20. This ring member forms a contacting device together with a ring 29 rigidly secured to the housing 20 and with balls 30 which cooperate with inclined surfaces provided on the end faces of the rings 28, 29. The balls climb up on the sloping surfaces, as soon as load is applied, and force the ring member 28 tight against the friction rolls 7. The friction roll carrier 22 is connected with the shaft 31 by a spline connection under the influence of a spring. Upon rotation of the shaft 4, the friction rolls 7 are rotated by frictional engagement, in which operation said rolls in planetary manner roll upon the running surface of the ring member 28. The carrier 22 is thereby set in rotary motion and drives the shaft 31. In the same manner as previously explained with reference to Fig. 1, a change in the transmission ratio is effected by displacing the carrier 22 in axial direction, in which case the contact radii extending between the friction rolls 7 and the running surfaces of the ring member 28 on the one hand and the disk 10 on the other hand are changed.

Figure 4:
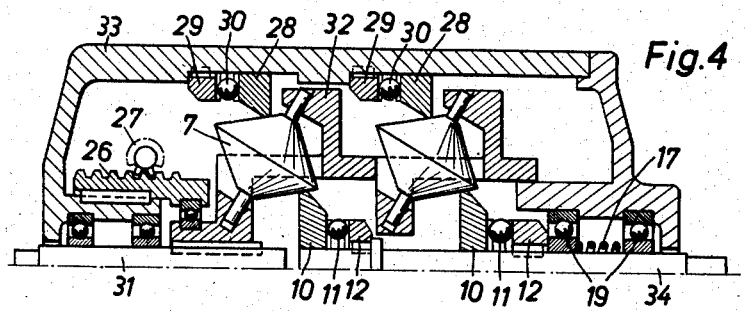
Fig. 4 is a construction in which simultaneously two groups of friction rolls according to Fig. 3 are arranged in parallel relationship.

In the embodiment of the invention according to Fig. 4, two groups of friction rolls 7 are arranged on a carrier 32, which is rotatably supported in a similar manner as shown in Fig. 3 and is axially movable by means of an adjusting device 26, 27. The friction rolls 7 arranged in the described planetary manner roll, as in Fig. 3, around two ring members 28 arranged within the housing 33, each of said members 28 being associated with a contacting device 29, 30. Moreover, a disk 10 cooperates with each group of friction rolls. Both disks 10 are arranged on a shaft 34 together with their associated contacting devices 11, 12. The transmitted power can be increased due to the parallel arrangement of the two groups of friction rolls. Any number of groups could be disposed in place of the two groups of friction rolls employed in the example shown.

Figure 5:
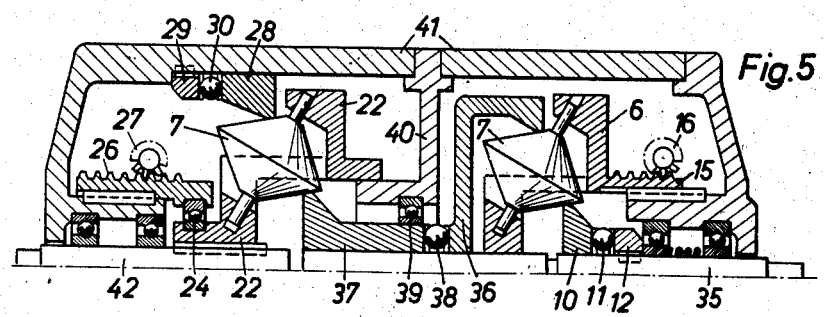
Fig. 5 is a modification, wherein two groups of friction rolls are arranged in series connection; one of said groups is formed in principle according to Fig. 1 while the second group is built fundamentally according to Fig. 3.

The construction according to Fig. 5 also shows two groups of friction rolls 7. The right hand group corresponds in principle to the group shown in Fig. 1, while the left hand group is similar to the one illustrated in Fig. 3, wherein if the shaft 35 represents the input shaft the take-off part 36 of the first group is rotatably connected with the driving part 37 of the second group by means of a contacting device 38. The part 37 is supported in an intermediate wall 40 of the housing 41 by a ball bearing 39. The remaining construction of these two groups is exactly similar to the constructions according to Figs. 1 and 3. The shaft 42 represents the take-off shaft. A separate adjusting device 15, 16 and 26, 27, respectively, is provided for each step of the friction drive. This design serves to enlarge the adjustable range and at the same time to increase the starting torque. The first step according to Fig. 1 delivers a high ratio of transmission, while great torques may be obtained by the second step according to Fig. 3. By this combination of the two groups, high ratios of transmission and simultaneously large torques can thus be obtained, when at the driving side first the construction according to Fig. 1 is chosen.

Figure 6:
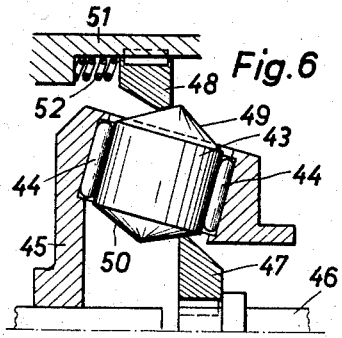
Fig. 6 is an embodiment having friction rolls which are supported on their circumferential area.

Fig. 6 shows a modification having cylindrical friction rolls 43, the circumferential area of which is supported in an axially movable carrier 45 by means of roller bearings 44 so that the axis of rotation of the friction rolls 43 is inclined with respect to the common axis of the running surfaces of the disk 47 rigidly mounted on the shaft 46 and of the ring member 48. The end faces of the friction rolls 43 are formed as conical surfaces 49, 50 in such a manner that the conical surface 49 includes an angle more acute than the conical surface 50. Upon axial displacement of the carrier 45, the distance is thereby changed between the running surface of the disk 47 and the running surface of the ring member 48. For this reason the latter is arranged axially movable in the housing 51 and is urged against the friction rolls 43 by springs 52. In the position shown, the distance between the parts 47 and 48 becomes greater when the rotary axis of the friction rolls 43 will be placed in closer proximity to the running surface of the ring member 48. In this position the rotational speed of the friction rolls 43 will be lower, when the disk 47 is the driving member, and the springs 52 will be more compressed the closer the friction roll axis approaches the ring 48. Thereby the contact pressure exerted upon the friction rolls 43 becomes greater according to the lower speed and the greater output torques. By a corresponding formation of the inclined surfaces of the friction rolls and of the springs 52, the contact pressure can automatically be regulated so that the transmitted torque at each time corresponds to the adjusted speed, whereby it is possible to obtain a constant power output at various initial speeds without the necessity of providing a contacting device such as shown in Fig. 1 and without the occurrence of an excess of contact pressure at higher initial speeds. This kind of control of the contact pressure may also be applied for friction rolls according to Fig. 1 by forming the conical surfaces in a corresponding asymmetrical manner. The contact pressure could also be regulated so that it increases with increasing initial speeds, in order to transmit great power outputs at high speeds, by providing for instance in Fig. 6 the inner conical surface 50 of the friction rolls 43 with a more acute-angled formation than the outer conical surface 49. Assuming the disk 47 to be the driving member, then the contact pressure would be greater if the disk 47 would be moved closer to the axis of the friction rolls.

By correspondingly forming the described conical surfaces, the contact pressure of the friction rolls may be adjusted to any torque characteristic for both constructions according to the invention, the one showing a stationary carrier according to Fig. 1 and also the other provided with a revolving carrier according to Fig. 3.

Instead of arranging the springs 52 between the ring member 48 and the housing 51, said ring member 48 could also be securely held in the housing 51 and springs could be provided between the movably supported disk 47 and the shaft 46.

The running surfaces cooperating with the friction rolls may be conical or slightly cambered. The conical surfaces of the friction rolls may also be provided with a slight curvature.

In the construction shown in Fig. 6, instead of being supported along the circumference thereof the friction rolls could also be supported by means of a central shaft in a manner shown for instance in Fig. 1.

In place of the illustrated adjustment by the intermediary of the gear wheel 16 and the toothed rack 15

(Fig. 1), any other kind of adjustment could be employed, such as a lever enabling directly or indirectly the adjustment of the carrier from the outside.

The proportion of the axial pressure exerted upon the drive shafts and consequently upon the ball bearings which have to withstand this pressure may be regulated at will by the selection of the angle of inclination between the disk 10 (Fig. 1) and the contact area of the friction rolls 7, or between friction rolls 7 and ring member 9, respectively. The more obtuse this angle is with respect to the rotary axis 3 and 4, respectively, the smaller will be the proportion of the axial pressure on the total contact pressure.

The power flow in the friction drive can take place in both directions, that means it is possible to use e.g. in Fig. 1 not only the shaft 4 but also the shaft 3 as driving shaft.

In similar manner as in Figs. 1 and 2 the running surface of the disk 10 is adjustable in radial direction due to the support of said disk on the shaft 4 with provision of clearance, both running surfaces or else the support of the friction rolls could be adjustable in radial direction.

The advantages of an infinitely variable friction drive according to the invention are:

Only two friction surfaces act upon the friction rolls.

The friction rolls are mounted between the friction surfaces so that only little axial pressure is produced and exerted upon the driving or driven shaft, which pressure may be reduced to the value zero of the total contact pressure. The efficiency of the friction drive thereby will be high and the construction simple. The bearing pressures exerted upon the friction roll axles by the contact forces may be partly or wholly nullified, resulting into an additional increase in efficiency.

Any number of friction rolls around the periphery of the contact zone can be arranged, which rolls together transmit the power.

In a simple manner various groups of friction rolls can be connected together in order to obtain increased power or an increased range of regulation, or both.

The construction is simple and of compact design.

I claim:

1. An infinitely variable friction drive comprising means defining running surfaces having a common axis, friction rolls between said running surfaces and rotating about an axis of rotation inclined to said common axis of the running surfaces, a driving shaft and a driven shaft operatively associated with the running surfaces, means affording an infinite variation of the transmission ratio between said driving and said driven shaft by displacement of the friction rolls in the direction of said common axis of the running surfaces, said friction rolls being provided with double-conical circumferential surfaces contacting the running surfaces, the generatrices of the conical surfaces of the friction rolls contacting the running surfaces being inclined at an angle to the common axis of said running surfaces, the two running surfaces being urgeable against the friction rolls and being staggered with respect to each other in the direction of their common axis by an amount remaining constant during the adjustment of the friction rolls, so that the bearing pressures of the friction rolls produced by the contact pressure compensate each other at least partially.

2. An infinitely variable friction drive comprising a driving shaft and a driven shaft, running surfaces arranged along a common axis and rotatable on the shafts, friction rolls arranged between said running surfaces and having double-conical circumferential surfaces contacting same, said friction rolls being arranged to rotate about an axis inclined to said common axis of the running surfaces, means for displacing the friction rolls in the direction of said common axis of the running surfaces in order to infinitely vary the transmission ratio between the driving and the driven shaft, pressure means associated with each running surface and adapted, upon rotation of the shafts to exert an axial pressure upon the running surface urging them against the friction rolls, the double-conical surfaces of the friction rolls being inclined with respect to the said common axis of the running surfaces and the latter being staggered with respect to each other so that the bearing pressures of the friction rolls resulting from the contact pressure compensate each other at least partially.

3. An infinitely variable friction drive comprising means defining running surfaces having a common axis, friction rolls between said running surfaces and rotating about an axis of rotation inclined to said common axis of the running surfaces, a driving shaft and a driven shaft operatively associated with the running surfaces, means affording an infinite variation of the transmission ratio between said driving and said driven shaft by displacement of the friction rolls in the direction of said common axis of the running surfaces, said friction rolls being provided with double-conical circumferential surfaces contacting the running surfaces, the generatrices of the conical surfaces of the friction rolls contacting the running surfaces being inclined at an angle to the common axis of said running surfaces, the two running surfaces being urgeable against the friction rolls and being staggered with respect to each other in the direction of their common axis by an amount remaining constant during the adjustment of the friction rolls so that the bearing pressures of the friction rolls produced by the contact pressure compensate each other at least partially, the friction rolls and the running surfaces being parallel to each other in at least two groups so that the transmission ratio of all groups together corresponds to the ratio of one group, the transmitted power of all groups together increasing in the same ratio as the number of groups, only one common adjusting device being provided for the axial adjustment of all groups of friction rolls.

4. An infinitely variable friction drive according to claim 3, in which at least two groups of friction rolls are arranged on a common carrier upon which the adjusting device acts.

5. An infinitely variable friction drive comprising running surfaces having a common axis, friction rolls, arranged between said running surfaces and rotating about an axis of rotation inclined to said common axis of the running surfaces, a driving shaft and a driven shaft operatively associated with the running surfaces, means affording an infinite variation of the transmission ratio between said driving and said driven shaft by displacement of the friction rolls in the direction of said common axis of the running surfaces, said friction rolls being provided with double-conical circumferential surfaces contacting the running surfaces, the inclination of said double-conical surfaces with respect to the common axis of the running surfaces being such and the latter being staggered with respect to each other in direction of their common axis so that the bearing pressures of the friction rolls produced by the contact pressure compensate each other at least partially, and a rotatable carrier for the friction rolls, one of the running surfaces being fixed against rotation so that the friction rolls roll around the fixed running surface in a planetary manner.

6. An infinitely variable friction drive according to claim 5, in which the friction rolls and running surfaces are arranged on behind the other in a plurality of groups such that the transmission ratios of the groups are combined.

7. An infinitely variable friction drive as claimed in claim 6, wherein in one group the carrier of the friction rolls is non-rotatable and the two running surfaces are rotatably arranged, while in another group the carrier of the friction rolls is rotatable and one of the running surfaces is disposed in non-rotatable and the other in rotatable manner.

8. An infinitely variable friction drive comprising running surfaces having a common axis, friction rolls, arranged between said running surfaces and rotating about an axis of rotation inclined to said common axis of the running surfaces, a driving shaft and a driven shaft operatively associated with the running surfaces, means affording an infinite variation of the transmission ratio between said driving and said driven shaft by displacement of the friction rolls in the direction of said common axis of the running surfaces, said friction rolls being provided with double-conical circumferential surfaces contacting the running surfaces, the inclination of said double-conical surfaces with respect to the common axis of the running surfaces being such and the latter being staggered with respect to each other in direction of their common axis so that the bearing pressures of the friction rolls produced by the contact pressure compensate each other at least partially, the two conical surfaces of the friction rolls being formed asymmetrically by providing one conical surface with a more acute angle than the other surface.

9. An infinitely variable friction drive according to claim 8, wherein one of the running surface carrier-members is axially movable against spring pressure so that the contact pressure is automatically adjusted to the desired torque characteristic upon axial movement of the friction rolls.

10. An infinitely variable friction drive comprising means defining running surfaces having a common axis, friction rolls between said running surfaces and rotating about an axis of rotation inclined to said common axis of the running surfaces, a driving shaft and a driven shaft operatively associated with the running surfaces, means affording an infinite variation of the transmission ratio between said driving and said driven shaft by displacement of the friction rolls in the direction of said common axis of the running surfaces, said friction rolls being provided with double-conical circumferential surfaces contacting the running surfaces, the generatrices of the conical surfaces of the friction rolls contacting the running surfaces being inclined at an angle to the common axis of said running surfaces, the two running surfaces being urgeable against the friction rolls.

References Cited in the file of this patent

UNITED STATES PATENTS

| | | |
|---|---|---|
| 2,574,530 | Castagna | Nov. 13, 1951 |

FOREIGN PATENTS

| | | |
|---|---|---|
| 683,063 | Germany | Oct. 30, 1939 |
| 148,001 | Sweden | Dec. 7, 1954 |
| 182,150 | Switzerland | Jan. 31, 1936 |